(12) United States Patent
Labinov et al.

(10) Patent No.: US 7,118,606 B2
(45) Date of Patent: Oct. 10, 2006

(54) FOSSIL FUEL COMBINED CYCLE POWER SYSTEM

(75) Inventors: Solomon Davidovich Labinov, Knoxville, TN (US); Timothy Robert Armstrong, Clinton, TN (US); Roddie Reagan Judkins, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 594 days.

(21) Appl. No.: 09/813,714

(22) Filed: Mar. 21, 2001

(65) Prior Publication Data

US 2002/0160238 A1    Oct. 31, 2002

(51) Int. Cl.
*B01J 8/00* (2006.01)
*H01M 8/04* (2006.01)

(52) U.S. Cl. .................. 48/127.9; 429/17; 429/21

(58) Field of Classification Search .......... 48/61, 48/197 R; 429/17, 19, 20; 95/114; 422/197
See application file for complete search history.

(56) References Cited

U.S. PATENT DOCUMENTS

| 4,087,976 | A | | 5/1978 | Morrow, Jr. et al. |
| 4,309,359 | A | | 1/1982 | Pinto |
| 4,810,472 | A | * | 3/1989 | Andrew et al. ............ 422/197 |
| 4,923,768 | A | * | 5/1990 | Kaneko et al. ............. 429/19 |
| 5,319,925 | A | | 6/1994 | Hendriks et al. |
| 5,417,051 | A | | 5/1995 | Ankersmit et al. |
| 5,449,568 | A | * | 9/1995 | Micheli et al. ............. 429/20 |
| 6,348,278 | B1 | * | 2/2002 | LaPierre et al. ........... 429/17 |
| 6,375,716 | B1 | * | 4/2002 | Burchell et al. ........... 95/114 |

FOREIGN PATENT DOCUMENTS

EP        0374368        8/1989

* cited by examiner

*Primary Examiner*—Glenn Caldarola
*Assistant Examiner*—Tom P. Duong
(74) *Attorney, Agent, or Firm*—Akerman Senterfitt; Neil R. Jetter

(57) ABSTRACT

A system for converting fuel energy to electricity includes a reformer for converting a higher molecular weight gas into at least one lower molecular weight gas, at least one turbine to produce electricity from expansion of at least one of the lower molecular weight gases, and at least one fuel cell. The system can further include at least one separation device for substantially dividing the lower molecular weight gases into at least two gas streams prior to the electrochemical oxidization step. A nuclear reactor can be used to supply at least a portion of the heat the required for the chemical conversion process.

13 Claims, 6 Drawing Sheets

FOSSIL FUEL COMBINED CYCLE POWER SYSTEM

STATEMENT REGARDING FEDERALLY SPONSORED RESEARCH OR DEVELOPMENT

The United States Government has rights in this invention pursuant to Contract No. DE-AC05-00OR22725 between the United States Department of Energy and UT-Battelle, LLC.

FIELD OF THE INVENTION

This invention relates generally to a high efficiency fuel cell/gas turbine combined power generation system and a method of operating such a system.

BACKGROUND OF THE INVENTION

New power systems operating on fossil fuels have been under development for several years. These systems are designed to increase efficiency (fuel energy conversion to electricity) and to reduce harmful emissions ($NO_x$, CO, $CO_2$) to the environment. Cogeneration and combined cycle system approaches can increase the efficiency by more than 20% compared to conventional power systems.

Several cogeneration and combined-cycle power systems of various configurations have been proposed that have the potential for achieving relatively high efficiencies. However, these systems depend on obtaining solutions to certain technical problems related to the concept. For example, these systems do not minimize harmful pollutants or maximize thermodynamic efficiency because they do not provide for recovery of synthesis from $CO_2$, and do not use fuel that passes through the fuel cells unreacted and do not efficiently use "waste heat" generated be the fuel cell stack.

Regarding thermodynamic inefficiency, the waste heat energy generated by fuel cells in these systems is used to drive closed water or open air power cycles. Closed water or open air power cycles can be thermodynamically modeled as reversible heat cycles, if losses such as frictional losses are ignored. For a reversible heat cycle which operates between two temperatures, maximum TH and minimum TC, the maximum cycle efficiency (e) is limited by the Carnot relation/equation $e=1-(TC/TH)$, where both temperatures are expressed in units of Kelvin.

Thus, the maximum theoretical efficiency of a closed water or open air power cycle is maximized when the cold reservoir is held as cold as possible, and the hot reservoir is held as hot as possible. Consequently, since the range of attainable practical high and low temperatures are limited, the maximum possible efficiency derivable from these reversible heat cycles are lower than the Carnot limit. As a result, practical efficiencies of these closed water or open air cycles cannot be higher than approximately 30 to 35%. Thus, the total efficiency of the overall process of energy conversion to electricity for an entire combined cycle cannot exceed approximately 55 to 60%. To further maximize efficiency of combined cycle power systems which use fuel cells, a new combined cycle system is needed.

SUMMARY OF INVENTION

A method for converting fuel energy to electricity includes the steps of converting a higher molecular weight gas into at least one lower molecular weight gas and supplying at least one of the lower molecular weight gases to at least one turbine to produce electricity. At least one of the lower molecular weight gases is then electrochemically oxidized in fuel cells adapted to produce electricity from the lower molecular weight gases. The method can further include the step of substantially dividing the lower molecular weight gases into at least two gas streams prior to the oxidizing step.

Separation devices can be used for the dividing step, preferably carbon fiber composite molecular sieves (CFCMS) or inorganic membranes. Each of the lower molecular weight gases can be electrochemically oxidized in the fuel cells. The fuel cells can be solid oxide fuel cells (SOFC). The method can further include the step of directing at least a portion of the heat generated by the fuel cells for use in the conversion step.

A method for converting fuel energy to electricity includes the steps of providing a synthesis gas having a plurality of chemical components, substantially dividing the synthesis gas into at least two gas streams and supplying at least one gas stream to a fuel cell to produce electricity. The method can further include the step of driving at least one turbine with at least one of the gas streams. The step of providing synthesis gas can include a reforming step. In a preferred embodiment, a gas principally containing methane (e.g. natural gas) is reformed in the reforming step, producing CO and $H_2$.

Separation devices can be used for the dividing step. The separation devices can be carbon fiber composite molecular sieves (CFCMS) or inorganic membranes. The method can include the step of directing at least a portion of heat generated by the at least one fuel cell to a reformer.

The synthesis gas can include CO and $H_2$, wherein CO can be substantially supplied to a fuel cell adapted to electrochemically oxidize CO, and $H_2$ can be substantially supplied to a fuel cell adapted to electrochemically oxidize $H_2$. Preferably, the CO fuel cell and the $H_2$ fuel cell are each solid oxide fuel cells. Carbon dioxide output by the CO fuel cell can be used to produce additional energy. The additional energy can be produced by using the $CO_2$ to drive a turbine. Output streams from at least one fuel cell can also be supplied to a combustion chamber for oxidation of fuel which may not have been fully oxidized electrochemically in the fuel cells.

Air supplied to the fuel cells can be first supplied to the CO fuel cell and then to the $H_2$ fuel cell. The method can further include the step of supplying air to a device for providing oxygen enriched air to the fuel cells. The step of providing a synthesis gas can include reforming a hydrocarbon containing gas. The hydrocarbon containing gas can preferably be methane or natural gas. The hydrocarbon containing gas can be supplied to a reformer at a pressure of at least approximately 8 atmospheres. In the preferred embodiment, the hydrocarbon pressure supplied to the reformer is approximately at least 40 atmospheres, which corresponds to the gas pressure in a typical gas main. In an alternate embodiment of the invention, a portion of the output from at least one fuel cell is directed to a gas turbine.

A system for converting fuel energy to electricity includes a reformer for converting a higher molecular weight gas into at least one lower molecular weight gas, at least one turbine to produce electricity from expansion of at least one of the lower molecular weight gases, and at least one fuel cell for electrochemically oxidizing at least one of the lower molecular weight gases to produce electricity. The system can further include at least one separation device for substantially dividing the lower molecular weight gases into at least two gas streams prior to the electrochemical oxidization step. The separation devices can be carbon fiber composite molecular sieves (CFCMS) or inorganic membranes.

Each of the lower molecular weight gases can be electrochemically oxidized in fuel cells. The fuel cells can be solid oxide fuel cells. The fuel cell may be a single fuel cell or multiple fuel cells in series (staged fuel cells). The system can further include a structure for directing at least a portion of heat generated by the fuel cells to a reformer.

A system for converting fuel energy to electricity includes a device for providing fuel having a plurality of chemical components, a separator device for substantially dividing the fuel into at least two gas streams and at least one fuel cell adapted for electrochemically oxidizing the gas streams. The system can further include at least one turbine, where expansion of the fuel is used to drive the turbine. The device for providing fuel to the system can be a reformer.

The reformer can reform a gas principally containing methane to produce CO and $H_2$. The separator device can be a carbon fiber composite molecular sieve (CFCMS) or an inorganic membrane. A portion of the heat generated by the at least one fuel cell can be directed to the reformer.

In a preferred embodiment of the invention, the fuel mixture includes CO and $H_2$. The CO can be substantially supplied to a fuel cell adapted to electrochemically oxidize CO, and $H_2$ can be substantially supplied to a fuel cell adapted to electrochemically oxidize $H_2$. The CO and $H_2$ fuel cells can be solid oxide fuel cells. Carbon dioxide output by the CO fuel cell can be used to produce additional energy, preferably through use of a turbine.

The system can further include a combustion chamber, wherein output streams from at least one fuel cell can be supplied to the combustion chamber for oxidation of fuel which may not have been fully oxidized. Air is supplied to the fuel cells can be first being supplied to the CO fuel cell and then to the $H_2$ fuel cell. The system can include a device for providing oxygen enriched air prior to delivery to the fuel cells.

When the system includes a reformer, the reformer can be used to convert a hydrocarbon containing gas to fuel which can be separated and electrochemically oxidized. The hydrocarbon containing gas can preferably be selected from a mixture principally being methane gas or natural gas. The natural gas is preferably supplied to the reformer at a pressure of at least approximately 8 atmospheres. More preferably, the natural gas pressure is supplied to the reformer from a gas main with pressure of at least 40 atmospheres, which allows for efficient use of the pressure in a gas main to obtain additional energy in the system.

BRIEF DESCRIPTION OF THE DRAWINGS

A fuller understanding of the present invention and the features and benefits thereof will be accomplished upon review of the following detailed description together with the accompanying drawings, in which.

DETAILED DESCRIPTION OF THE PREFERRED EMBODIMENTS

An apparatus and method for producing a high efficiency electrical power output combines fuel cells and gas turbines. The invention can increase the utilization efficiency of fuels, such as natural gas, in the process of fuel energy conversion to electricity by approximately 20 to 30% compared with existing power systems to approximately 80 to 85%. In addition, the invention produces substantially fewer environmentally harmful emissions compared to other power systems, generating up to approximately three times less harmful emissions compared to existing power systems. Another advantage of the invention is the production of significant quantities of drinking water.

Figure 1:
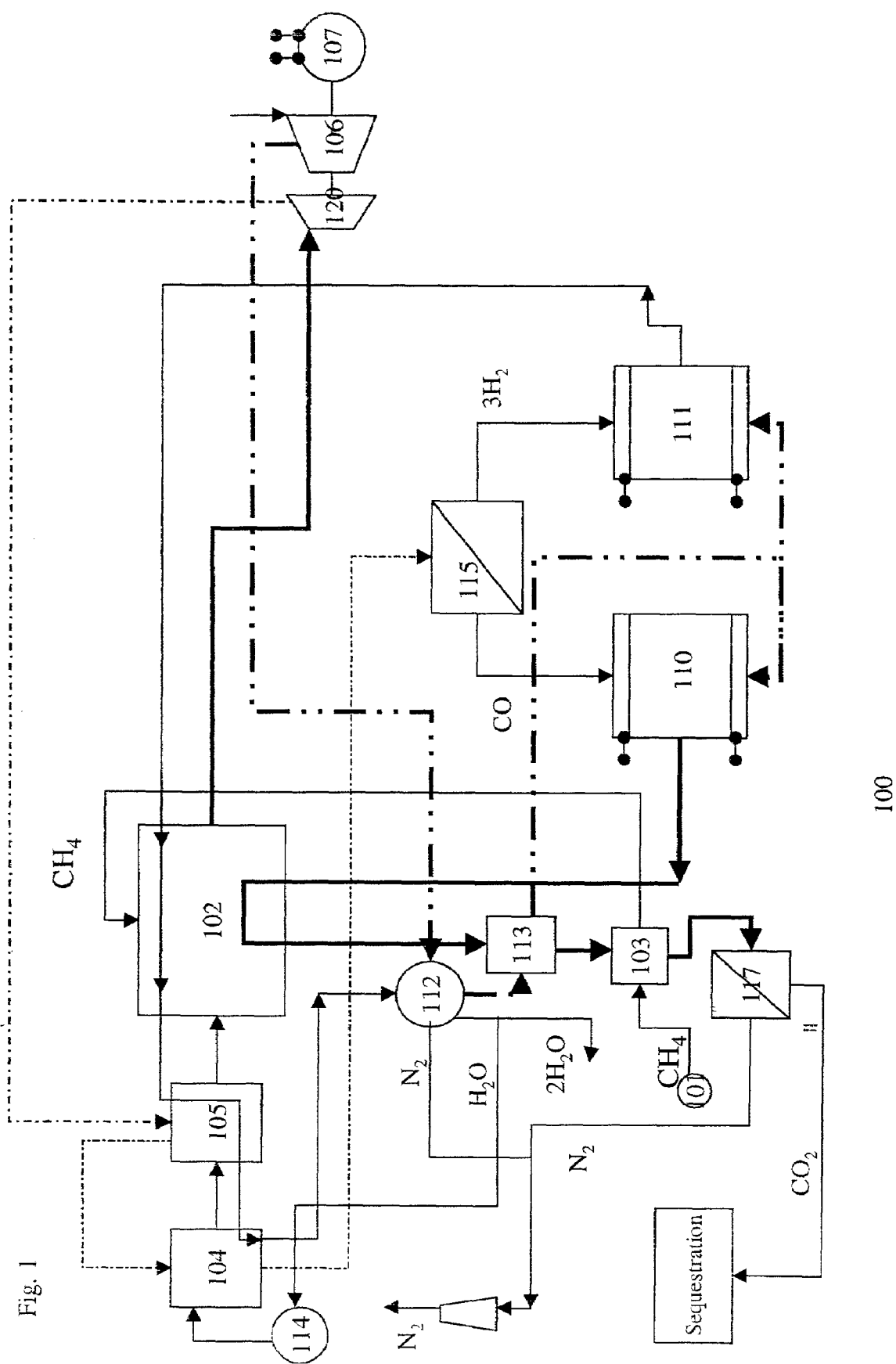
FIG. 1 illustrates a schematic of a basic combined power system configuration in accordance with an embodiment of the invention.

The apparatus and diagram showing the basic configuration of an embodiment of the invention is shown in FIG. 1. Although specific chemicals, operating conditions and system interconnections are shown therein, the invention is in no way limited to the specific chemicals, operating conditions and system interconnections which are shown in FIG. 1.

Combined power system 100 includes a fuel source 101, such as methane or natural gas, which enters the reformer 102 at a pressure above ambient pressure. As used herein, natural gas refers to a mixture of gases that principally includes methane together with varying quantities of ethane, propane, butane, and other gases. Preferably, the fuel source pressure provided is at least 40 atmospheres, which corresponds to the pressure in a typical gas main. The pressurized fuel is preferably fed to the reformer 102 through a heat exchanger 103 to heat the fuel prior to delivery to reformer 102. Similarly, steam is preferably fed to reformer 102 by passing water through one or more heat exchangers, such as 104 and 105. Heat exchanger 104 is preferably used for heating water while heat exchanger 105 is preferably used for turning the water heated by heat exchanger 104 into steam. Given their differing purposes, heat exchangers 104 and 105 will preferably each feature designs appropriate for their specific purposes.

In the case of methane fuel, the reforming process results in the formation of a synthesis gas having CO and $H_2$:

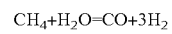

$$CH_4+H_2O=CO+3H_2$$

Hot synthesis gas can also be produced by natural gas reforming, partial oxidation, or alternatively by coal gasification or supplied from an external source. As used herein, synthesis gas is a mixture of gases which can be used as a feedstock for a chemical reaction. For example, carbon monoxide and hydrogen to make hydrocarbons or organic chemicals, or hydrogen and nitrogen to make ammonia are considered synthesis gases.

However, appropriate fuel for use in system 100 includes generally any gas which can be converted (e.g. reformed) into one or more lower molecular weight components, at least one of the lower molecular weight components being electrochemically oxidizable. Hereinafter, the term "synthesis gas" will refer to one or more lower molecular weight components derived from a higher molecular weight compound, provided at least one of the lower molecular weight components is capable of being electrochemically oxidized. Although specific examples and system descriptions to follow refer to a synthesis gas which contains $H_2$ and CO and appropriate apparatus to efficiently process these gases, the invention is in no way limited to use of $H_2$ and CO and the associated apparatus shown and described herein.

Synthesis gas output from reformer 102 is directed to turbine 120, preferably at a pressure of at least 40 atmospheres, which corresponds to the pressure in a typical gas main and at high temperature (e.g. 1000 to 1100° K), where it can be expanded to produce electricity. Alternatively, synthesis gas can be supplied externally, removing the need for reformer 102. In any event, an air compressor 106 and an electric generator 107 may also be driven by the energy produced by the expansion of the synthesis gas.

The thermodynamic efficiency of the turbine expansion process is increased compared to prior systems in at least two ways. The use of a working fluid or working fluid mixture having a high specific volume (such as CO and $H_2$) to power turbine 120 results in an increased power density and energy conversion efficiency for the overall power system compared to systems which use lower specific volume working fluids, such as conventional combustion products (e.g. $CO_2$ and air). The relationship between turbine work and a working fluid's specific volume is the following:

$$\frac{dH}{dP} = V \text{ or } \frac{\Delta H}{\Delta P} = V_{av}$$

where $\Delta H$ is the change of enthalpy in the turbine which is equivalent to the work produced; $\Delta P$ is the change of pressure in the turbine and $V_{av}$ is the average specific volume of the working fluid in the turbine. Based on the above relation, assuming the same change in pressure ($\Delta P$), the work produced by the turbine from expansion of the working fluid is proportional to the average specific volume of the working fluid. Thus, more work can be produced by turbine expansion through use of higher average specific volume working fluids.

In a preferred embodiment of the invention, the working fluid supplied to turbine 120 is synthesis gas comprising CO and $H_2$. Its specific volume (equal to its; volume divided by its mass) is approximately two times greater than that of steam and three times greater than that of air, all other conditions being equal. Thus, assuming the same rate of expansion in turbine 120, the specific power (power/mass) generated by the expansion of the synthesis gas is approximately two and three times greater, respectively, compared to turbines which use steam or air as the working fluid. High specific power densities produced by the ivvention permit turbine 120 to have lighter weight and smaller dimensions. As a result, the use of synthesis gas for turbine expansion provides lower overall system cost compared to other power systems. In addition, the use of synthesis gas as the working fluid for turbine expansion largely avoids the inherent thermodynamic efficiency limitations imposed by the Carnot principle on conventional power systems which use cyclic processes because the synthesis gas used by system 100 goes to the turbine 120 at an elevated pressure (e.g the pressure of a typical gas main) and is subsequently reacted electrochemically.

After expansion in the turbine 120, hot, reduced-pressure synthesis gas can be directed to heat exchangers, such as 104 and 105, where the hot synthesis gas can release heat. The heat released can be used to produce steam. Cooled synthesis gas can then be directed to separation device 115 for substantially splitting the synthesis gas (e.g. $H_2$ and CO) substantially into its component flow streams. For example, in the case of methane supplied to a reformer, separation device 115 allows separation of the mixed CO and $H_2$ gas stream substantially into its components, CO and $H_2$. Preferably, gas separation device 115 is an inorganic membrane type separator and/or a carbon fiber composite molecular sieve (CFCMS). CFCMSs feature two-mode operation, having distinct adsorption and desorption cycles. Accordingly, in the embodiment of the invention which uses CFCMSs, system 100 utilizes at least two (2) CFCMSs connected in parallel, and phased appropriately to support a continuous output.

The degree of component separation attainable from a given separation device 115 depends on the separator design characteristics, flow thermodynamic parameters and gas occupation time. For example, a system such as system 100 shown in FIG. 1 having CFCMS membrane separators separates $H_2$ and CO under a pressure drop of approximately 6 atm. Under these conditions, the resulting separation isolates approximately 80–85% of all $H_2$ from the mixed synthesis gas stream using a CFCMS separator of appropriate dimensions.

Incomplete $H_2$ separation does not significantly influence the efficiency of system 100. Hydrogen left in mixture with the CO after separation is provided to the CO fuel cell 110 where it can be oxidized electro-chemically together with CO to produce electricity.

Assuming use of a synthesis gas having CO and $H_2$, following separation by separator 115, the gas stream containing the $H_2$ flow can be preferably be directed to a hydrogen fuel cell 111, while the CO flow can be preferably directed to a separate carbon monoxide fuel cell 110. The fuel cells may be a single fuel cell or multiple fuel cells connected in series (staged fuel cells). Both fuel cells generate power through oxidation of the $H_2$ and CO provided, forming water and carbon dioxide, respectively. Since both CO and $H_2$ can be electrochemically oxidized by fuel cells, the invention, the combined cycle system can produce an efficiency of up to 40% resulting from solely the direct fuel cell 110 and 111 conversion of synthesis gas chemical energy to electricity.

In addition to electricity produced, both fuel cells 110 and 111 generate significant quantities of heat from the respective electrochemical oxidation processes. The overall system efficiency can be substantially increased through efficient utilization of the "waste heat" generated by the fuel cells for cogeneration (combined heat and power). In the preferred embodiment of the invention, the combined system cycle uses heat generated by the fuel cells to supply heat to reformer 102 and heat exchanger and/or supply heat to power a turbine, such as turbine 120, to produce an additional source of electrical power.

The mixture of steam (and nitrogen, assuming air is used) output by fuel cell 111 at high temperature is preferably directed to reformer 102, where it can provide heat for the reforming process, and then can be directed to heat exchangers 104 and 105 where the mixture can release most of its remaining heat. The cooled steam (and nitrogen, assuming air is used) can then be directed to a condenser-separator 112 where water can be condensed and nitrogen can be returned to the atmosphere. Heat produced by the condensation process can be used, for example, to preheat air from compressor 106.

Similarly, hot $CO_2$ exhaust from fuel cell 110 is also preferably directed to reformer 102. After reformer 102, exhaust gases from fuel cell 110 can be directed to heat exchangers, such as heat exchangers 113 and 103, to release most of its remaining heat. The cooled $CO_2$ gas can then be directed to a membrane or CFCMS separator 117 where the $CO_2$ can be separated from nitrogen (if air is used as the oxygen containing gas for fuel cell electrochemical oxidation), the nitrogen released to the atmosphere while the $CO_2$ can be preferably released to sequestration.

In the preferred embodiment of the invention, the fuel cells 110 and 111 used are solid oxide fuel cells. Solid oxide fuel cells are essentially all-ceramic power generating devices which use air (or oxygen) and fuel flows to generate electricity and heat. Thus, like a conventional fuel cell, they produce electric power by an electrochemical reaction, avoiding the air pollutants and efficiency losses associated with traditional combustion processes. For example, zirconia electrolytes can be used to allow the cells to operate at higher temperatures than other fuel cells, producing more energy per unit of fuel and substantially less carbon dioxide (a greenhouse gas). Solid oxide fuel cells do not use boiling liquids or moving parts to generate electricity. Accordingly, solid oxide modules can be expected to operate reliably for many years.

Fuel cells, such as solid oxide fuel cells, provide simple output adjustment. Thus, power systems according to the invention can also provide the capability to adapt quickly to changes of external load without a significant decrease in efficiency. Through the convenient adjustment of air (or oxygen) and fuel flows, fuel cells can be easily adjusted for changing demands for electricity by boosting output when necessary, then cycling down output when demand becomes reduced.

Fuel cell materials and designs have resulted in the development of solid oxide fuel cell configurations with the capability of achieving very high fuel utilization rates. For example, up to 90% or more of the fuel fed to solid oxide fuel cell stacks can be utilized. However, other fuel cell types, such as molten carbonate, alkaline, PEM or phosphoric acid fuel cells can also be used with fuels such as $H_2$ in the invention.

The oxygen required for fuel cell operation can be supplied from an oxygen containing gas, such as air, and preferably provided by a compressor 106. Alternatively, oxygen-enriched air can be provided. Oxygen enrichment can be achieved through use of a separator device, such as a CFCMS. As a further alternative, substantially pure oxygen can be supplied to the fuel cells 110 and 111. The oxygen containing gas can be preferably preheated by a condenser-separator 112 and then additionally heated by heat exchanger 113 before being supplied to fuel cells 110 and 111.

Even though system 100 uses water in the reforming process, system 100 does not require an external source of water because the system 100 is a net water generator. For example, a 1 MW system can produce approximately 10 tons of water each day. The water produced by the system can be used for a variety of purposes. Approximately one third of the water formed in the cycle can preferably be fed to the heat exchanger 109 under high pressure with the help of a pump 114 before being supplied to reformer 102. Approximately two-thirds of the water formed can preferably be provided to consumers or may be safely discarded because it is environmentally safe.

Figure 2:
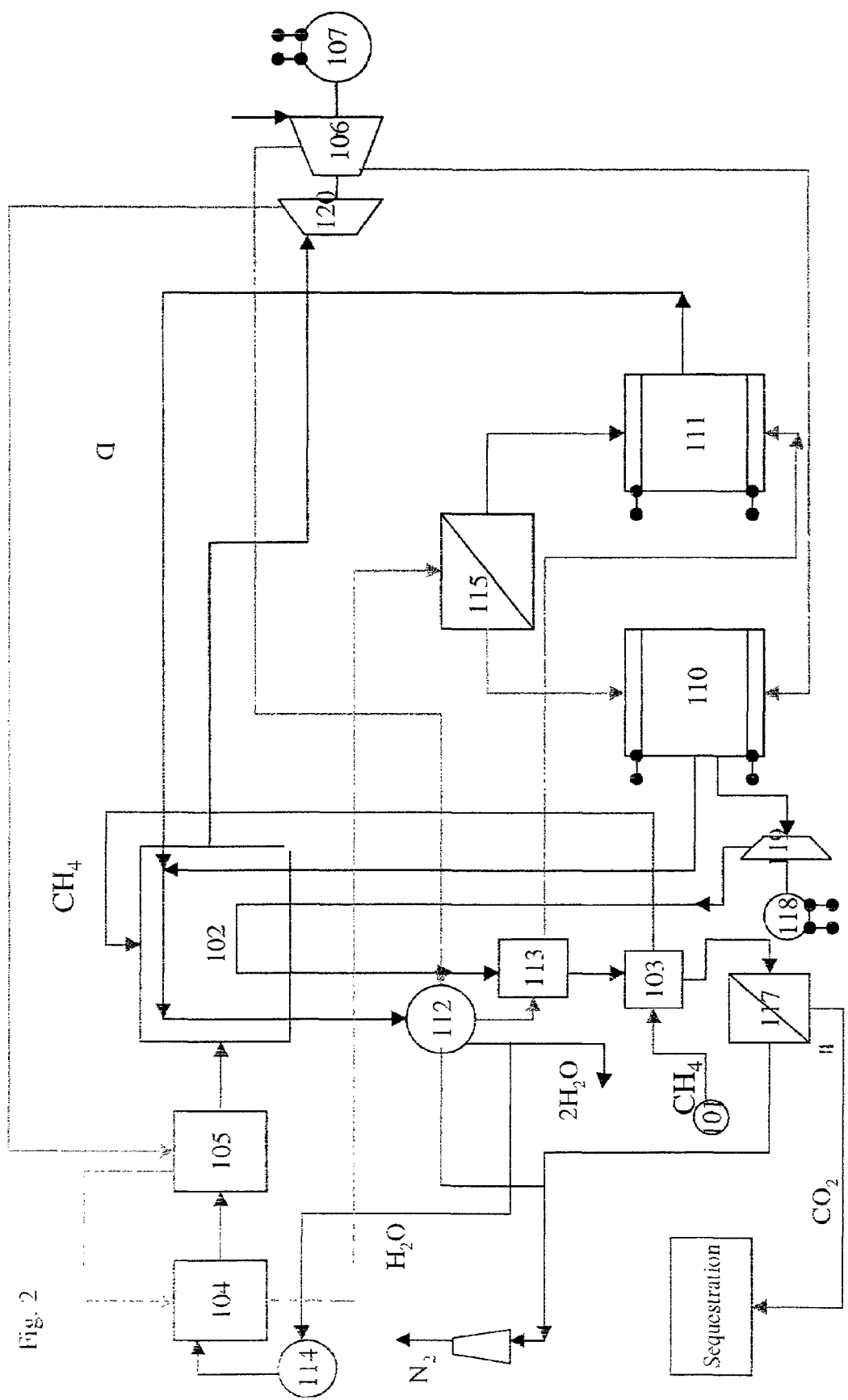
FIG. 2 illustrates a schematic of a modified combined power system configuration in accordance with an embodiment of the invention.

Depending on the purpose and conditions of application, the proposed basic system configuration can be modified to achieve certain improved characteristics. FIG. 2 illustrates a schematic of a modified combined power system 200 configuration in accordance with an embodiment of the invention which can be used to achieve higher efficiencies. This embodiment can also result in deeper cleaning of exhausted gases from CO, $CO_2$ and $NO_X$, compared to the basic system configuration illustrated in FIG. 1.

Referring to FIG. 2, following expansion through turbine 120, the synthesis gas can be provided to the separator device 115 at a higher pressure compared to the embodiment shown in FIG. 1. For example, this can be accomplished by sacrificing some turbine expansion, resulting in a synthesis gas pressure after turbine 120 being higher than the basic embodiment shown in FIG. 1. Higher pressure at separator 115 permits a considerable reduction in the required separator 115 dimensions, while still providing for the separation of approximately 85 to 90% of $H_2$ from the synthesis gas mixture. With this configuration, the $H_2$ fuel cell 111 will operate at a pressure of approximately 1 atm., and the CO fuel cell 110 will operate at a pressure of approximately 6 atm.

In this embodiment, air (or oxygen-enriched air or oxygen) flows fed to the respective fuel cells are fed from different stages of the compressor 106. Fuel cell 100 receives air (or oxygen-enriched air or oxygen) directly from compressor 106, while fuel cell 111 receives air (or oxygen-enriched air or oxygen) after passing through condenser-separator 112 and heat exchanger 113. This configuration advantageously provides additional output power derived from the power of the $CO_2$ flow after fuel cell 110. A turbine 119, which can drive electric generator 118, can also be included in the system 200.

Two separate flows leave the fuel cell 110. The first flow contains the products of oxidizing CO to $CO_2$ and part of the air flow used as an oxidizer, and the second flow contains the rest of the fuel cell 110 output flow. The first flow can go to turbine 119 under a pressure of approximately 6 atm, and then can be directed to heat the working fluid in reformer 102. The first flow can then be directed to heat exchangers 113 and 103.

The second flow is mixed with the output flow from fuel cell 111 that contains water, unreacted $H_2$ and air having increased $N_2$ content. The oxygen in the mixture reacts with unreacted hydrogen resulting in nearly full oxidization. Heat released from the oxidation can be used for heating the working fluid in reformer 102.

The first output flow fuel cell 110 is moved separately from the output stream from fuel cell 111. This permits separator 117 to efficiently separate out $N_2$ from the system for atmospheric release and facilitate the capture of $CO_2$ for sequestration.

Figure 3:
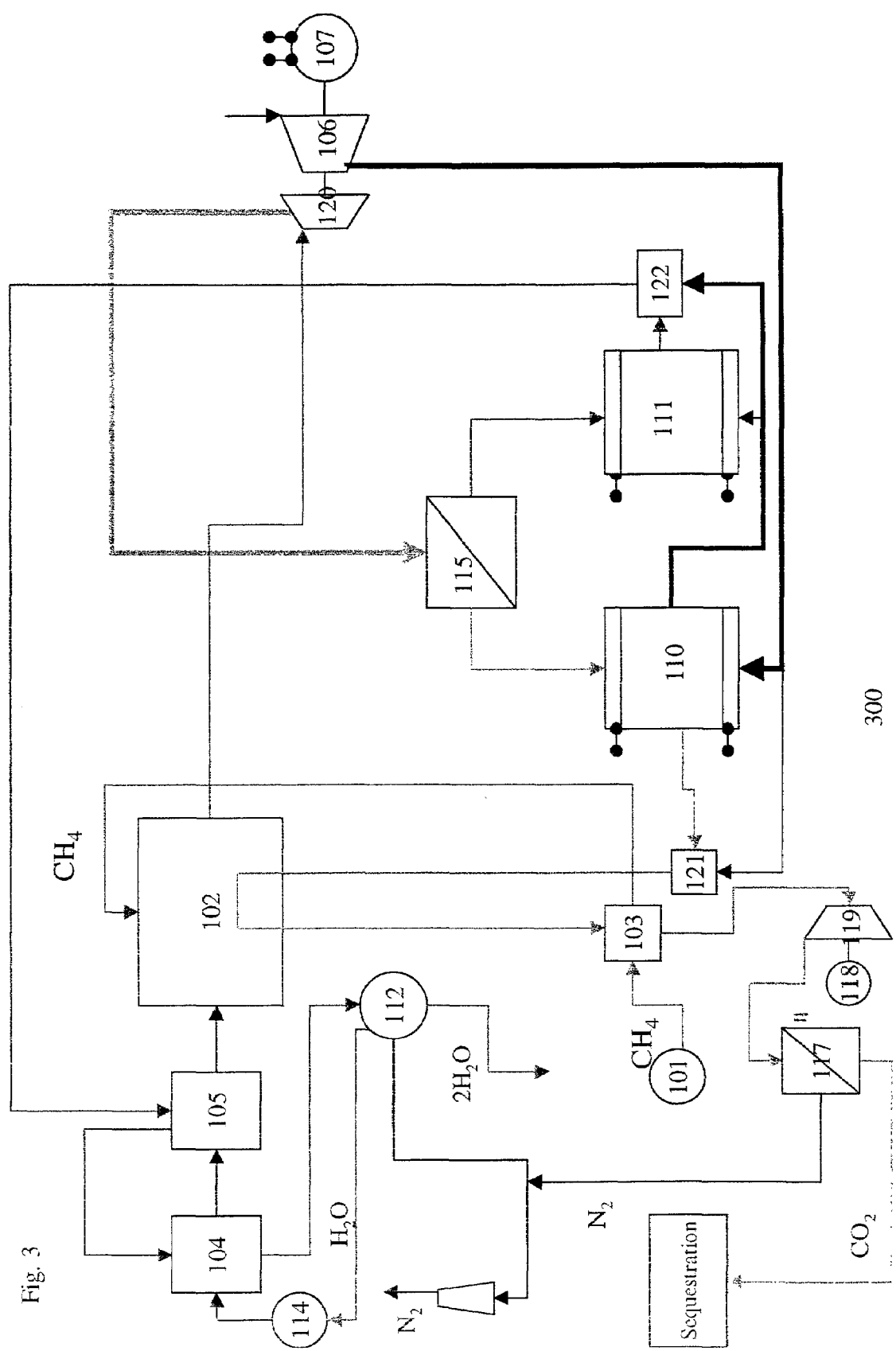
FIG. 3 illustrates a schematic of a modified combined power system configuration in accordance with another embodiment of the invention.

FIG. 3 illustrates a schematic of a modified combined power system 300 configuration in accordance with another embodiment of the invention that can be used to reduce the environmental impact of the system. One method of reducing environmental impact is through increasing the system efficiency. To utilize fuel more completely, combustion chambers 121 and 122 can be provided to receive the electrochemical oxidation products and non-utilized fuel output by the fuel cells 110 and 111, respectively. Combustion chambers 121 and 122 can provide a second chance to extract energy from unreacted fuel by more fully oxidizing non-utilized fuel output by the fuel cells to produce additional heat energy which can be converted into additional electricity.

In this embodiment, air from compressor 106 at pressure of approximately 6 atm can be directed first to the CO fuel cell 110 and then to the $H_2$ fuel cell 111. This can result in better utilization of oxygen in the air. Alternatively, an oxygen separation membrane (not shown) can be used to supply higher oxygen concentrations (rather than air) to one or both of the fuel cells 110 and 111. This results in better utilization of oxygen in the air. Alternatively, oxygen-enriched air or oxygen may provided from external sources (not shown). In that event, air separation device based on CFCMSs or solid state ceramic membranes can be used (not shown).

The system shown in FIG. 3 also divides heat output by CO fuel cell 110 between reformer 102 and turbine 119. Turbine 119 receives the output flow from CO fuel cell 110 at nearly 6 atm. since reformer 102 and heat exchanger 103 result in little reduction in pressure of the output flow. However, reformer 102 and heat exchanger 103 extract significant heat from CO fuel cell 110 output flow. Accordingly, turbine 119 is primarily powered by the remaining pressure of the CO fuel cell 110 output flow which reaches turbine 119.

Figure 4:
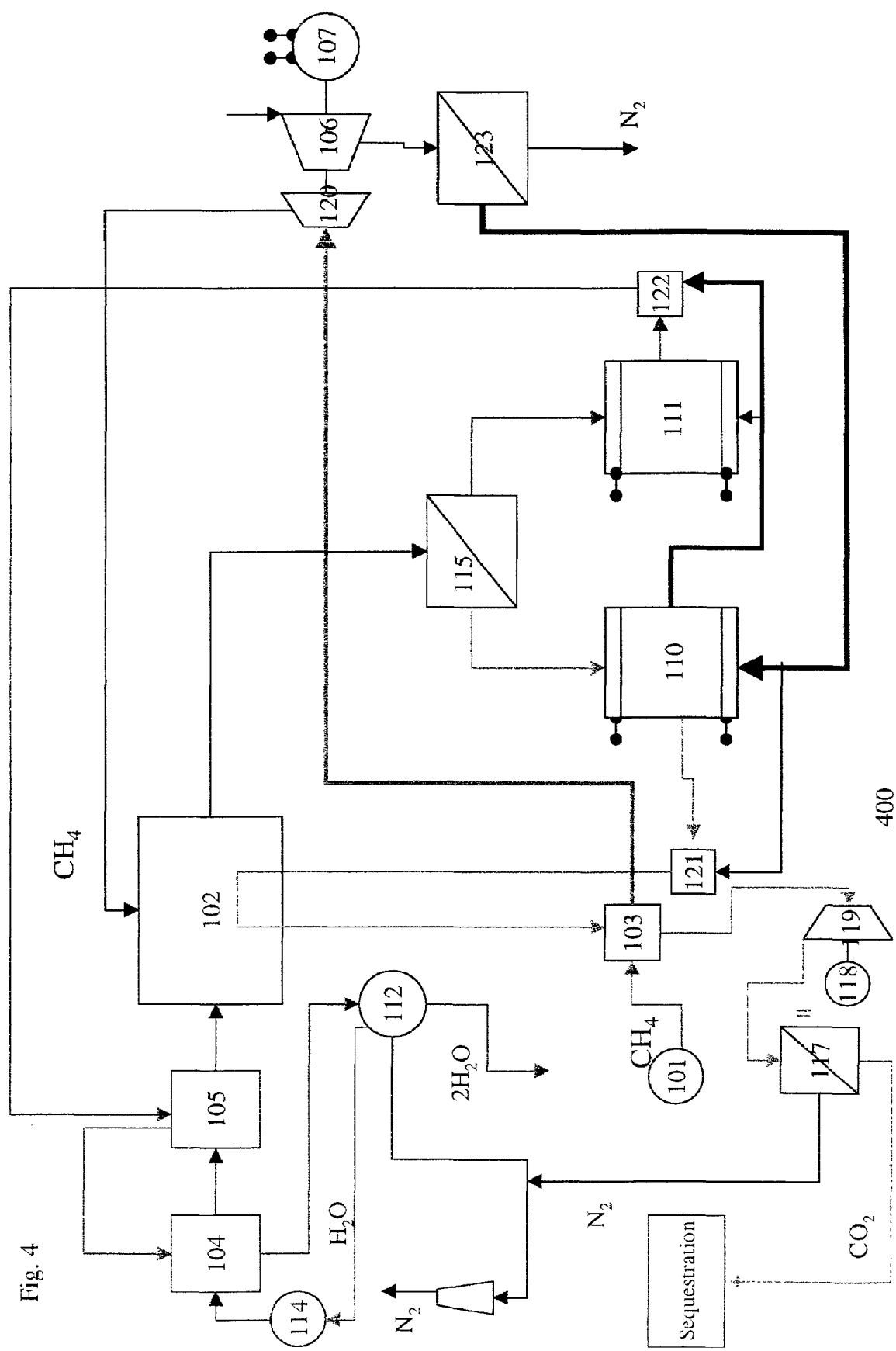
FIG. 4 illustrates a schematic of a modified combined power system configuration in accordance with yet another embodiment of the invention.

FIG. 4 illustrates a schematic of a modified combined power system configuration in accordance with yet another embodiment of the invention which can be used to generate higher output power without increasing the size of system components. By placing the gas turbine 120 before the reformer 102 in the power cycle, rather than after the reformer 102, higher power results by virtually eliminating synthesis gas leakage through the turbine shell. This leakage can significantly reduce system output power. However, with this arrangement, the efficiency of the overall system may decrease a small amount. As in FIG. 3, system 400 also includes combustion chambers 121 and 122 to receive the electrochemical oxidation products and non-utilized fuel output by the fuel cells 110 and 111, respectively, to utilize fuel more completely.

Use of pure oxygen can increase fuel cell 110 and 111 output power up by approximately 20% compared to fuel cells which use air to provide oxygen. Alternatively, oxygen rich air may be used by adding separator 123. In that event, separator 123 can preferably be CFCMS or solid state ceramic membranes.

The systems shown in FIGS. 2–4 each divide the heat evolved by fuel cell 110 between the reformer 102 and the turbine 119. With this arrangement, the Carnot cycle limitation is further weakened as the flow containing CO was not compressed in the compressor before. In principle, the efficiency of any use of a fuel cell's heat in a Brayton and/or Rankine cycle will be limited by the Carnot cycle efficiency.

Figure 5:
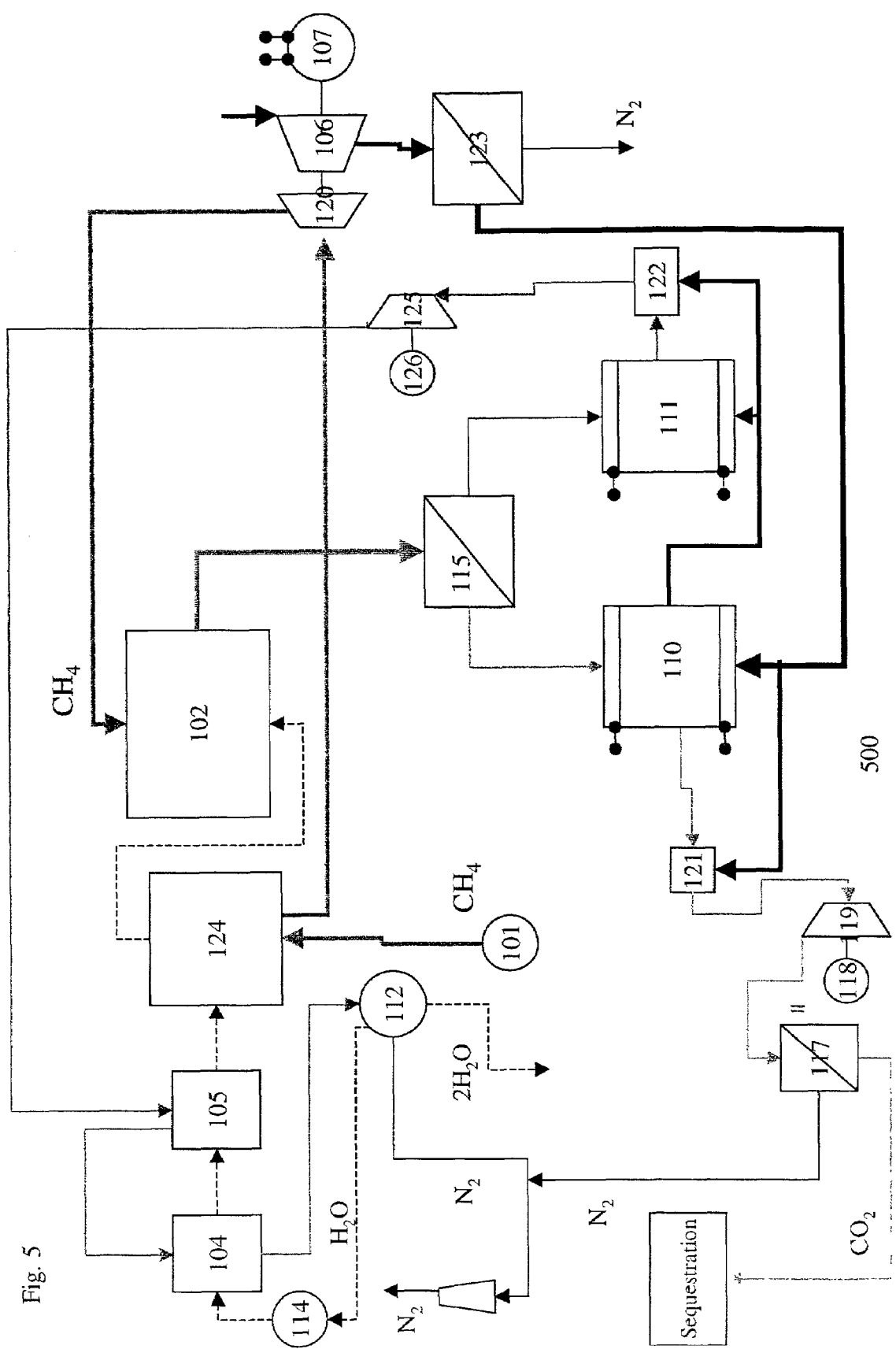
FIG. 5 illustrates a schematic of a modified combined power system configuration in accordance with yet another embodiment of the invention.

FIG. 5 illustrates a schematic configuration of a modified combined power system in accordance with yet another embodiment of the invention which provides at least a portion of the heat required for the reforming process by a nuclear reactor 124. In this regard, nuclear reactor 124 may be a fission or fusion type reactor. Methane, natural gas or a similar fuel or mixture of fuels, is first heated by nuclear reactor 124. Heated fuel can then, at least in part, flow to a gas turbine 120, where it can be expanded to produce electrical power; and then be directed to reformer 102. A portion of the fuel output by nuclear reactor 124 can be directly provided to reformer 102. As shown by the dashed line from nuclear reactor 124 and reformer 102, water (steam) can also be heated by nuclear reactor 124 before being supplied to reformer 102.

Flows of the products of electrochemical oxidation from fuel cells 110 and 111 can be directed to additional combustion chambers 121 and 122 and then to gas turbines 125 and 119, where they can produce additional electrical power by driving electric generators 126 and 118, respectively. The power system shown in FIG. 5 has an important advantage over conventional nuclear plants as it is allows for the utilization of nuclear reactor generated heat with an efficiency of approximately 80–85%, compared to an efficiency of approximately 27–30% achieved by conventional steam-turbine nuclear plants. The modification proposed as shown in FIG. 5 can be applied both to new combined nuclear/fossil fuel power plants and to redesigned operating nuclear power plants so that they may become more energy efficient.

Figure 6:
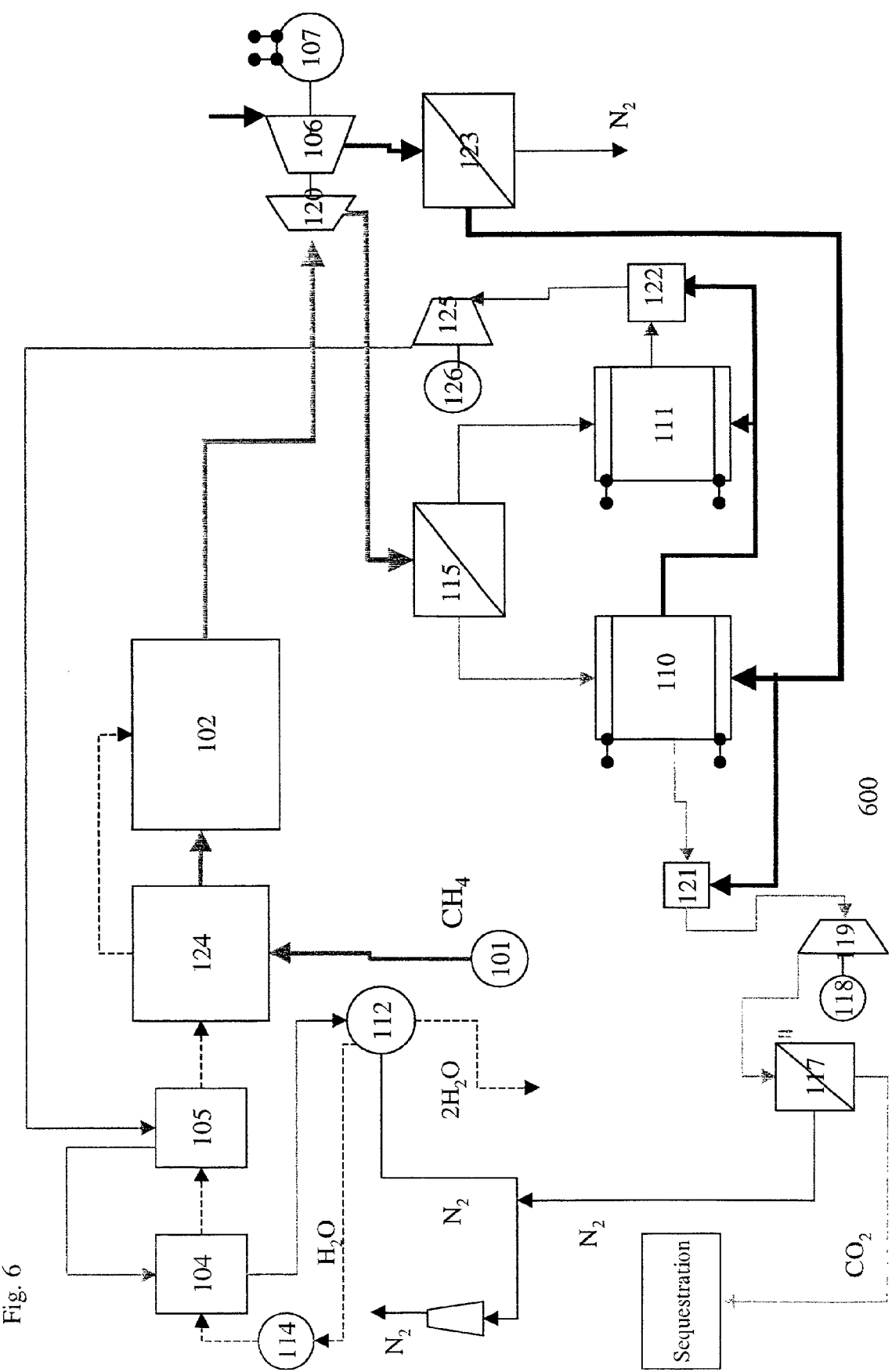
FIG. 6 illustrates a schematic of a modified combined power system configuration in accordance with yet another embodiment of the invention.

FIG. 6 illustrates a schematic configuration of a modified combined power system in accordance with yet another embodiment of the invention which also provides nuclear reactor 124 as in FIG. 5, but directs synthesis gas output by reformer 102 to turbine 120 prior to the synthesis gas being directed to separator 115. Energy produced by expansion of the synthesis gas in turbine 120 can be used to drive air compressor 106 and electric generator 107. This configuration may be contrasted to the embodiment shown in FIG. 5, where synthesis gas output by reformer 102 is fed directly to separator 115. This configuration can provide an increase in system output power, compared with the output power available from the system shown in FIG. 5.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as described in the claims.

What is claimed is:

1. A system for converting fuel energy to electricity, comprising:
    a reformer for converting a higher molecular weight gas into at least one mixed gas stream of lower average molecular weight comprising at least a first lower molecular weight gas and a second gas, said first and second gases being different gases, wherein said first lower molecular weight as comprises $H_2$ and said second gas comprises CO;
    at least one turbine coupled to an electrical generator having an input connected to an output of said reformer, said turbine receiving said mixed gas stream and generating electricity from expansion of said mixed gas stream;
    a separator connected to an output of said turbine, said separator having a first and a second output for dividing said mixed gas stream, wherein a first gas stream mainly comprising said $H_2$ is provided at said first output and a second gas stream mainly comprising said CO is provided at said second output;
    a first fuel cell, an anode of said first fuel cell connected to said first output for electrochemically oxidizing said first gas stream to produce electricity; and
    a second fuel cell, an anode of said second fuel cell connected to said second output for electrochemically oxidizing said second gas stream to produce electricity.

2. The system for converting fuel energy to electricity of claim 1, wherein said separator comprises at least one selected from the group consisting of carbon fiber composite molecular sieves (CFCMS) and inorganic membranes.

3. The system for converting fuel energy to electricity of claim 1, wherein said fuel cells are both solid oxide fuel cells.

4. The system for converting fuel energy to electricity of claim 1, further comprising structure for directing at least a portion of heat generated by said fuel cells to said reformer.

5. The system for converting fuel energy to electricity of claim 1, further comprising a nuclear reactor for generating heat.

6. The system for converting fuel energy to electricity of claim 5, wherein at least a portion of said heat is directed to said reformer to heat said higher molecular weight gas.

7. The system for converting fuel energy to electricity of claim 1, wherein said higher molecular weight gas is provided by a pipeline which provides pressurized natural gas, said mixed stream being directly provided to said turbine from said reformer without additional steps for either compressing or heating said mixed gas stream.

8. The system for converting fuel energy to electricity of claim 1, wherein said higher molecular weight gas principally contains methane and is reformed by said reformer, wherein said first lower molecular weight gas comprises $H_2$ and said second gas comprises CO.

9. The system for converting fuel energy to electricity of claim 1, wherein at least one of said first and second fuel cells produces a $CO_2$ output, wherein expansion of said $CO_2$ is used to produce additional energy.

10. The system for converting fuel energy to electricity of claim 1, further comprising a combustion chamber, wherein output streams from at least one of said fuel cells are supplied to said combustion chamber for oxidation of fuel which has not been fully oxidized.

11. The system for converting fuel energy to electricity of claim 1, wherein said first and second fuel cells comprise $H_2$ and CO fuel cells, respectively, and air is supplied to both said first and second fuel cells, said air first being supplied to said CO fuel cell and then to said $H_2$ fuel cell.

12. The system for converting fuel energy to electricity of claim 11, wherein said air is supplied to a device for providing oxygen enriched air prior to delivery to said fuel cells.

13. The system for converting fuel energy to electricity of claim 1, wherein said hydrocarbon containing gas is natural gas, said natural gas being supplied to said reformer at a pressure of at least approximately 40 atmospheres.

* * * * *